United States Patent [19]
Stein et al.

[11] Patent Number: 5,978,779
[45] Date of Patent: Nov. 2, 1999

[54] DISTRIBUTED ARCHITECTURE UTILITY

[75] Inventors: Derek N. Stein, Larchmont, N.Y.;
Arthur L. Thomas, Saddle River;
Mark Alexander, Montvale, both of
N.J.

[73] Assignee: Merrill Lynch, Pierce, Fenner & Smith, New York, N.Y.

[21] Appl. No.: 08/970,483

[22] Filed: Nov. 14, 1997

[51] Int. Cl.[6] ................................................. G06F 17/60
[52] U.S. Cl. ............................................... 705/37; 707/10
[58] Field of Search ................................. 705/1, 35, 36, 705/37; 707/1, 10, 104, 500, 523, 530

[56] References Cited

U.S. PATENT DOCUMENTS

| | | | |
|---|---|---|---|
| 4,346,442 | 8/1982 | Musmanno | 705/36 |
| 4,376,978 | 3/1983 | Musmanno | 705/36 |
| 4,597,046 | 6/1986 | Musmanno et al. | 705/36 |
| 4,674,044 | 6/1987 | Kalmus et al. | 705/37 |
| 4,774,663 | 9/1988 | Musmanno et al. | 705/37 |
| 5,270,922 | 12/1993 | Higgins | 705/37 |
| 5,297,032 | 3/1994 | Trojan et al. | 705/37 |
| 5,502,637 | 3/1996 | Beailieu et al. | 705/36 |
| 5,596,748 | 1/1997 | Kleewein et al. | 707/10 |
| 5,655,152 | 8/1997 | Ohnishi et al. | 395/856 |
| 5,671,363 | 9/1997 | Cristofich et al. | 705/37 |
| 5,706,499 | 1/1998 | Kleewein et al. | 707/10 |
| 5,847,708 | 12/1998 | Wolff | 345/349 |

*Primary Examiner*—Edward R. Cosimano
*Attorney, Agent, or Firm*—Hopgood, Calimafde, Kalil & Judlowe, LLP

[57] ABSTRACT

The invention provides a system and device for integrating and structuring the relationships of a financial services provider (FSP) with its clients and with third parties (counterparties) with which the FSP transacts business. Preferably, each entity with which the FSP transacts business, preferably also including entities internal to the FSP, is assigned a unique, non-intelligent identifier (CCID), and a relationship is established between each identifier and at least on other entity likewise identified. The system allows the FSP's users to seamlessly access information and transact business with all entities regardless of whether such entities are clients or third party providers (such as money managers). The system can be implemented on a network system. The system preferably also includes a library by which documents required for a particular transaction or account are associated with the entity(ies) engaging in such transaction or for which the account is generated, and also preferably a tracking system for assuring that required documents are forwarded when necessary and executed and returned as required.

11 Claims, 7 Drawing Sheets

DISTRIBUTED ARCHITECTURE UTILITY

FIELD OF THE INVENTION

The present invention is directed to a distributed database architecture, to the use of such a database on a general or special purpose computer, and to the methods for creating and using such a database, especially in the area of financial management.

BACKGROUND OF THE INVENTION

Computer management of many business functions has grown exponentially in the last two decades. Originally, computers operated as efficient record keepers and large databases were stored and accessed as needed. More powerful programs were developed, and product and account management functions were automated. Exemplary systems include an asset management system disclosed in U.S. Pat. No. 4,346,442 to Musmanno, and automated trading system of U.S. Pat. No. 4,674,044 to Kalmus, et al.—the contents of both patents are incorporated by reference as if restated in full. These systems include programmed decision-making on an account or product basis and substantially enhance performance and efficiency of the system proprietor.

However, the growth of individual products and the associated software in product management has created a second tier of system management issues. In financial services, a provider may offer several dozen different products or accounts, each having a collection of individual processing characteristics specific to that type of product or account. Indeed, as is conventional in this industry, accounts and products are added to the servicer's portfolio of offerings in an incremental fashion. The developers of the software that support the products and account innovations work incrementally and largely independently. Accordingly, these developers—consistent with their diverse backgrounds and objectives—create products and services that lack any integration therebetween or, for that matter, uniformity in design approach.

In particular regard to processing financial and brokered transactions for large clients, such as major corporations and institutional investors, the utilization of product-specific or account-type specific systems, as is typically implemented, creates various problems. One resultant problem is the duplication of data, function, and personnel for similarly-structured products administered on different systems; the evolution of these systems is not as dependent upon differing needs compared with related systems but of poor integration of similarly functions and data handled differently among the systems. Another problem is unmanageable maintenance of these types of systems; the functions performed by these systems, and the code needed to implement such functions, have grown to a size and convoluted complexity where systems integration and testing is virtually impossible and development results in the interruption of business activities. Yet another problem is the sheer complexity of the code, which is so convoluted and particular that structural and efficiency changes are difficult if not impossible to implement.

Still other shortcomings exist in present systems. Given the present global market, in which trading can be performed continuously, processing in "batch" mode is an unacceptable practice. Financial transactions can be initiated across a broad range of hardware and/or software platforms, among distributed locations, making integration and continuous processing difficult to achieve. Virtually inherent in such varied platforms are conflicting problems, the redundant generation of the same data, and the lack of coherent standards and controls for achieving systems integration.

The legacy of the above environment is a group of powerful software applications operating and accessible only independently of each other. These applications are supported and updated inconsistently across the enterprise, by different groups of engineers, with differing objectives and time frames. The end result is multiple standards, redundant files, and often data errors and failed system cross-processing. In addition, the disparate applications can create a maintenance nightmare due to the complexity and lack of common architecture.

It was with this recognition of such problems with past systems that formed the impetus and starting point for the present invention.

OBJECTS AND SUMMARY OF THE PRESENT INVENTION

It is, therefore, an object of the present invention to provide a data processing system that creates a unified infrastructure for control and data transfer to a plurality of function and task specific applications.

It is another object of the present invention to provide a database access system that employs a specific protocol to permit a continuous processing environment.

It is still another object of the present invention to provide a data management infrastructure that employs a network centered architecture to permit distributed processing of tasks and functions in accordance with pre-defined and universally applied protocols.

Yet another object of this invention is a database creation and processing system that allows the user (e.g., a client manager) to access client and related data in a seamless fashion without regard to whether the related data concerns or is provided by another client or even a third party providing services to the same client and/or providing services through the user.

The above and other objects are realized in a database management system that provides embedded logic with database entries to permit more powerful access, storage and system operation. The data is conformed to pre-defined constraints and is configured to permit logical access in accordance with plural rule and table entries assigned to the various applications using the data or generating new data.

In another embodiment, this invention provides a system for managing the transaction, in the form of buying, selling, underwriting, distribution, tracking, clearing, and/or analyzing, of a financial product by a client, which system comprises a plurality of stations for user entry and/or receipt of data and/or commands relating to said financial product and said transaction, each of said stations providing a user interface for accepting said entry and/or receiving said data, and said plurality of stations communicating through a network, at least one database for storing data about (i) said client and any related counterparty to said client, (ii) said financial product, and (iii) activity, positions, and balances for said client, said at least one database accessible through said network, at least one application program for processing said commands and data associated therewith, said application program accessible through said network, and an application program interface, through which data and/or commands pass between said station and one or both of said database and said application program, for normalizing commands and data into a format accepted by said station and by said database and said application.

BRIEF DESCRIPTION OF THE FIGURES

The foregoing features of the present invention are more fully and readily understood from the following detailed description of a specific illustrative embodiment thereof, presented hereinbelow in conjunction with the accompanying drawings of which.

DETAILED DESCRIPTION OF EMBODIMENTS OF THE INVENTION

Figure 1:
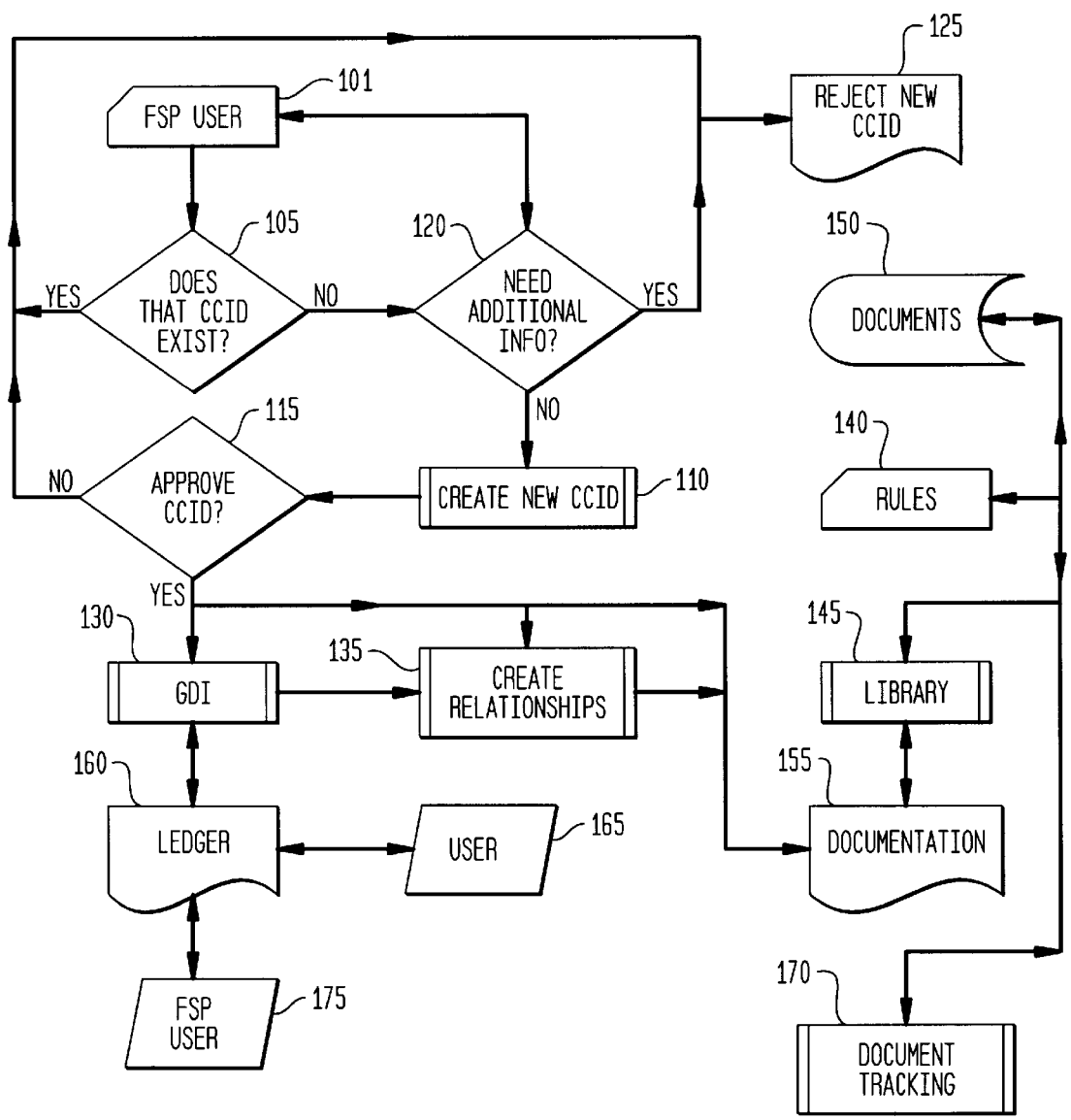
FIG. 1 is an overview of a general CCID processing scheme according to this invention.

Generally, the present invention overcomes the problems of existing systems by a combination of central repositories to reduce or eliminate redundant data (for examples, client, product, transaction activity, balance, and/or position information), and seamless access to client/counter-party information, product information, and books and records data by separate but integrated subsystems for each. The architectural environment preferably includes (a) an application program interface (API) for requesting and obtaining data from an application program, (b) a transaction generator for creating transaction data (e.g., as parameterized commands or variables), (c) indirect addressing coordination of client/transaction/data ("linking") for related clients, accounts, transactions, and the like), (d) rules hierarchy, (e) separation of applications from data so that data can be operated upon independently of the application, and optionally (f) time stamping and/or (g) conversion utilities.

In one preferred embodiment the present invention concerns a database and a system for the management thereof where the financial service provider ("FSP") has access to client, counterparty, and related information without regard to the type and/or source of related information. In other words, the system allows the FSP seamlessly to view relationships between and among all of the entities in the database. For example, a typical brokerage will have individuals and institutions as clients; the brokerage can offer a number of services, including various different account types (e.g., the central assets account described above), various transaction services (e.g., stock trading, commodities trading, wire fund transfers), various products (e.g., money markets, mutual funds), and often access to third-parties' (called "counterparties" herein) products and services. Further, those counterparties may elect to conduct transactions through the FSP. For example, a client may invest in a counterparty's mutual fund while that counterparty uses the services of the FSP to buy and sell all or some of the stocks or other instruments of which the mutual fund is comprised.

The present invention allows the FSP access to a client's account information and to all of the related information regardless of whether that information is particularly related to the client's information or to a counterparty providing services to the client. This seamless integration is provided by synthesized data protocol termed herein a CCID, a "client/counterparty identification" which facilitates direct and indirect addressing of all of the financial relationships integrated with a particular client.

For the system to function as desired, every entity in the database is associated with a CCID and a new CCID is created for new entities not existing in the database. The CCID is preferably unique, and is preferably non-intelligent. The categories of entities for which a CCID will be assigned are typically selected from among the group consisting of: a legal owner of a security, cash, or other investment instrument; a money manager; an issuer of stock; a guarantor for a client or a client's investment instrument; a brokerage or other entity who introduced a client; a counterparty; a custodian for an account (e.g., an Individual Retirement Account's custodian); an internal entity or division of the FSP (e.g., a foreign branch, a commodities branch); a prime or principal transactions broker; an executing broker; a broker-dealer; and the like (e.g., a joint back office, where a broker-dealer is clearing transactions through an internal entity of the FSP on a non-disclosed basis). Other entities, such as the spouse, child or other dependent of a legal owner also can be given a CCID. Every entity preferably is assigned a unique CCID, and every entity preferably has only one CCID. The FSP, and desired internal entities, preferably also are assigned separate, unique CCIDs.

A unique CCID, as a non-intelligent identifier, can be generated by a number of different methods. Architecturally, a central site preferably is responsible for generating all CCIDs, which avoids redundant and non-unique CCIDs and provides undesirable protection against communications or other problems connecting the central CCID processing site to the other portions of the architecture. Alternatively, a unique CCID can be generated at a particular site of the distributed architecture; by assigning to each such site a unique identifier, and providing each site with a monotonically incrementable database, and optionally date and time stamps, a CCID can be generated locally or remotely (rather than at a central site) with assurances that the CCID generated will still be unique. This site-generated CCID may not be totally non-intelligent if the site information, date, and/or time stamp extends from the CCID generated. However, such a CCID will preferably contain no intelligent financial or personal information.

Still considering the client of the FSP, a particular type of relationship between the client (who has a unique CCID) and every other entity with which the client has a financial connection is created. Example of typical relationships between a counterparty or FSP and a client can include one of the following types: a money manager; a legal owner; a counterparty; an introducing firm; a guarantor; a pending allocation (for money managers); and an anonymous allocation (for money managers).

From the CCIDs and the relationships, a Profile can be derived for any entity assigned a CCID. Typically, such Profiles will be created for client accounts, but can include any of the entities for which a given system allows CCIDs to be assigned. For example, in the instance that a client has security holdings managed by the FSP and also invests in a counterparty's mutual fund, the client's Profile will include the client's CCID, the FSP's CCID, and the counterparty's CCID. Thus, the Profile allows the FSP to access financial relationships for which it is responsible without reference to whether the relationships include clients, relative/dependents, counterparties, and the FSP or an internal entity thereof. Preferably, the Profile includes all of the relationships in which any particular CCID participates.

In accordance with the varying features of the present invention, Documentation Library is provided to prevent multiple and/or redundant document disclosure requests required for the client to transact a particular product or service offered by the FSP. The Library preferably allows for systematic aging of documents, and preferably also checks for a client's authorization to transact a given product or service in view of the required documents. Further, implementation of this Documentation Library, which can include various artificial intelligence (AI) components, preferably is controlled by an axiomatic set of rules derived from governmental, state, and/or the FSP's (and/or counterparty's) internal regulations or protocols. For example, the relationship between a client and the FSP or a counterparty can have attributes requiring certain SEC (Securities and Exchange Commission) rule disclosures, entry of a taxpayer status (e.g., non-profit, SEP-IRA, trust account), the language used for transactions, the reporting currency type, electronic data sources (and associated identification), cash investment preferences and percentage investments (e.g., how cash that is swept or deposited into a general account will be invested, typically in the FSP's money market or a limited number of no-load mutual funds managed by the FSP), and the statement type and frequency (for the client and/or the counterparty).

This overview is now described with reference to the system depicted in FIG. 1. A user, typically an account/client manager of the FSP, provides an input 100 to create a new entity, thereby requiring the assignment of a CCID. From the input data a determination 105 is made as to whether a CCID already exists for the entity. Assuming for now that no CCID has been assigned to the entity, the input data branches then to a module 110 for the creation of a CCID. Typical information required as necessary for assigning a CCID will be at the discretion of the FSP. Preferably, the information necessary for assigning a CCID comprises: a basic Profile relationship (e.g., identifying the entity as a client or a counterparty); a status for the CCID; and additional Profile information. The status of the CCID is an FSP-defined status, and preferably ranges from prospective (e.g., a new CCID), to pending (e.g., sufficient information to create the CCID and now awaiting acceptance), to approved (i.e., CCID is in the system), to inactive and/or archived (e.g., for inactive and/or closed/unused CCIDs). The additional Profile information preferably comprises such information as any known relationships between the newly added CCID and other existing CCIDs, delivery instructions (for the GDI or "Global Delivery Instruction" Set, described hereinafter), documentation requirements (for the Documentation system, described hereinafter), and any transaction statement and/or order confirmation preferences.

Once the available information is used to create a CCID, this provisional CCID information branches to a decision 115 for approving the creation of a CCID. (While some systems may find it beneficial to implement a CCID without a pre-approval process, a pre-approval of the CCID is preferred in the present invention because the approval eliminates the possibility of having to delete the CCID, all relationships, and any or all product and/or service transactions if the CCID later is not approved.) The approval can be generated electronically by comparing the new CCID information with pre-defined criteria. Alternatively, approval can require the new CCID information to be sent through various levels of the FSP's organizational protocol, such as the credit department, the legal department, and/or the marketing department, before the new CCID is approved as valid. If it is determined that insufficient information was provided to create a CCID, then the data flow branches to a decision 120 requiring additional information for creating a valid CCID; if the proper additional information is provided (shown in FIG. 1 as being provided by the FSP's user), then data processing branches back to the CCID creation 110 and an attempt is made again to create a new (but revised/supplemented) CCID that is sent for approval 115 as before; if the proper information is not supplied (typically within a specified period of time, e.g., seven days), then the CCID is rejected and an output 125 so indicates the rejection (and optionally the reasons for the rejection, preferably detailing the types or categories of missing or insufficient information). Similarly, processing branches to 125 to reject a CCID after block 105 if the requested CCID already exists. Approval of the CCID can also require that certain documentation and/or agreements from the client or counterparty be deposited with the FSP (as discussed further in the Documentation section, below).

Information required for CCID approval preferably also includes desired delivery information, shown in FIG. 1 as the GDI (Global Delivery Instruction Set). Once a CCID is approved, the delivery information is preferably transferred to the ODI 130. The ODI can be a separately maintained database, and preferably is treated as such. The ODI contains information on each CCID as to the method(s) by which products and/or services of the FSP are purchased by and delivered/sold to the client ("CCID"), and may also be a function of the relationship between the CCID and another CCID. For example, a client may desire that stock and security purchases and sales utilize funds debited and credited to a clients' particular account with the FSP, and that any dividends be directly deposited into the client's bank account. In this case, the client's bank information must be added to the GDI system and a CCID assigned to the bank and a relationship established between the client and the bank via their respective CCIDs. Support for common settlement and transaction methods is most desirable, and support is preferably provided for such systems as DTC, SWIFT, Fed Wire, Free Cash, Euroclear, Cedel, and International Custodial Banks or others as is per se well-known in the financial industry. After the CCID is approved, any relationships between the new CCID and existing CCIDs is established and stored 135 for further use.

As noted above, various relationships can exist between a client, the FSP, and possibly counterparties. For the FSP to satisfy the client and provide the desired products and services, federal, state, and/or internal FSP protocols may require certain disclosure documents and/or a written agreement with the client (or a counterparty). Such rules and protocols can be input 140 to the Library processing center 145; for example, that the client must execute certain papers in order to open and maintain an Individual Retirement Account, or trade in stock or commodity options or futures contracts. An existing library of stored documents, forms, and the like can be provided 150 on-site or at a remote location, or at distributed locations, so that any of the FSP's system users can use the same, up-to-date document; i.e., so that there is a central repository for documents. Likewise, various counterparties may require that the client execute certain documents in order for the client to transact a given product or service. In the Library processing center, an entity's CCID can be associated with a required document or set of documents. When a relationship is created 135 between a client and an FSP entity or a counterparty requiring certain document disclosures, such information is used by the Documentation system 155 to generate all of the documents the client will require from the FSP and/or third party providers.

A Ledger 160 is then created that includes the client's CCID and related information, any relationships, the related documentation information, and the deposit. Once a new client has been entered into the FSP's database, a Ledger is generated for the client. The Ledger for a given client preferably includes the client's Profile information used to create the CCID, a summary of the client's holdings (which may be subdivided into different types of financial instruments), and all related CCIDs and the relationship between the other CCID(s) and the client's delivery instructions.

Such information in the Ledger is now accessible to the user 165. Preferably the user, as mentioned above, is the FSP's manager for the client's account, or is a supervisor of the manager. Alternatively, with the advent of services allowing clients to electronically access their account information (typically from a personal computer via modem to a BBS at the FSP's institution or one of a number remotely distributed BBS ports, or via hypertext or file transfer protocol ("http" or "ftp", respectfully)), this invention contemplates making such information available to the client. Such information can be made available by what may be termed a "virtual" ledger; some databases provide the ability to view certain sets of data parameters, even if such parameters have not been created and/or stored together, by creating a virtual ledger (data table) having only the desired information. A virtual ledger would allow a client to call in to determine his or his profile and be presented with a user-friendly, FSP-determined (and/or client-modified) personal ledger.

Ledgers can be external for clients and counterparties, and internal for proprietary control of trading, processing, multicurrency, and posting functions. Further examples of internal Ledgers include those used to indicate transactions related to a Trader Book (inventory of an instrument), inter- and/or intracompany postings, an omnibus (catch-all) ledger, transaction error processing, transaction suspended processing, department specific (e.g., legal, human resources) information, banking (e.g., off-site monetary transactions), and syndicate information (e.g., underwriting). External Ledgers can be user-defined if external clients and/or counterparties are allowed external access.

Ledgers can also be assigned an identification, preferably one which, like the CCID, is unique and non-intelligent. Preferably the Ledger ID is also independent of any associated CCID. Client-defined Ledgers which are accessible only externally and only by a limited number of entities (e.g., only the FSP and the client) can be provided with non-unique identifiers because access is limited. On the other hand, the Ledger identifier can be unique to an entity or to the entire system. An identification (CCID or Ledger ID) unique to the entire system allows for global (system-wide) access to the Ledger.

Logic allowing for the creation of a Ledger can be dependent on whether the Ledger is internal or external. For example, creation or modification of an external Ledger can be permitted if the associated CCIDs exist and the requester is in-house to the FSP (e.g., a trader, financial department, legal department, sales office) or is the client. After a Ledger is created, it can be assigned a status, as described above for the CCID. The status (e.g., pending, approved, inactive, archived) can be displayed to one who accesses the Ledger. Changes to the Ledger are preferably controlled by password or other authorization, are preferably allowed only by certain entities (e.g., by the FSP's branch office, trading, marketing, operations, and/or by the client). Further, a change to a Ledger can be scheduled to take effect only at a specified date in the future, and such information is preferably displayed when the Ledger is viewed. Changes can also be made secure by requiring a date and/or time stamp, and/or hierarchical password protection, for system security and tracking purposes.

Access, and optionally further transaction initiation, is preferably controlled by some sort of password and/or hierarchical protection to eliminate unauthorized access and transactions. Preferably, security is provided by a combination of access lists and passwords, optionally in a hierarchical architecture (e.g., allowing some changes at lower levels and providing more security for more important changes). More preferably, whenever a user logs on to the system, an access control list is generated for and downloaded to the user's site. The access control list can be a look-up table of those locations the user has permission to access; a password is preferably required for actual access to occur. Security protocols can also be established between informational or transactional transfers between or among requesters and clients/counterparties, and preferably within the operating system environment. Still further security can be provided by having a dual system of servers and data back-ups.

The Library system also includes necessary delivery information (GDI) for a given product or service. When a Ledger is created, the information from the GDI system (user preferences) is compared with the delivery methods available, as stored by the Library, and potential conflicts flagged and the FSP alerted to the potential problem.

One of the benefits of this system is that all of the documentation necessary for disclosure or execution by a client can be identified and updated instantaneously. As shown in FIG. 1, a document tracking system 170 is provided that monitors the initiation of a document request (e.g., for a new client or CCID), receipt by the client of the document, return of an executed document, aging of documents, and/or document renewal requests. For example, if an issuer or custodian needs to communicate to the security holders information about the security (e.g., special board meeting, change in dividend), then the CCID for that issuer/custodian entity is used to route and transfer the necessary documents into storage 150. Thereafter, all of the client CCIDs having a relationship to the issuer/custodian CCID can be identified by the present system and the proper documents forwarded to the client. That is, the present system preferably includes a database search engine for searching for particular information in CCIDs, Ledgers, and relationships. As with other security systems, searching criteria can be limited to specific areas. The tracking system 170 then monitors any receipt of a document sent to and/or now required from the client, as well as the lack of such a return. An alarm system can be integrated with the tracking system to annotate the Ledger with information as to the status of any documentation required from the client or counterparty.

The creation or addition of a relationship often requires that new documents be sent to the client. Thus, to change a client's Ledger, a relationship is added between the client and the counterparty's CCID; if no CCID exists for the counterparty, one must be created (as described above). For example, Smith has an account at Able & Baker brokers, and wants to invest in the Jones mutual fund; Jones uses Able & Baker for some or all of the stock transactions associated with Jones' management of its fund. A CCID for Jones would have to be input to the Able & Baker system if it did not already exist. Then, relationships are established between the client and Jones by associating the Jones CCID with the client's Ledger, a money manager (client-Jones), as well as another relationship between Jones and Able & Baker (Able & Baker acts as the broker for Jones' transactions). Lastly, the Library and Documentation systems determine the documentation requirements of Jones, by examining relationships Jones has with Able & Baker's clients, and determines those clients to whom the required Jones documentation should be sent (and optionally the exact types and/or number of documents required).

As another example, assume that the client desires to engage in a transaction involving a foreign security that is handled by Able & Baker's foreign department. A CCID will exist for the foreign department (typically the FSP and all of its departments should each have an associated CCID when the database is established) but a new relationship must be created. The relationship can be input by the FSP user 175. This relationship can be added to the existing Ledger.

Alternatively to maintaining a single Ledger for a client, multiple ledgers can be associated with a single client. In such a situation, each Ledger is preferably an account of the transactions associated with a particular relationship; as such, each Ledger can also be given a unique identified (analogous to the CCID). There can be a master Ledger and various subLedgers. Thus, in the previous example, where a new relationship is established between existing CCIDs, the Ledger established for the new relationship can be assigned a status, analogous to the statuses mentioned above for the CCID. In this way, the Ledger can be assigned a temporary status (e.g., pending) until the necessary documents are sent to (and/or executed and returned from) the client, the foreign department approves the transaction, and all Profile information for the CCID has been approved.

Yet another example of a change to the data can occur when a Ledger is inactive for a set, predetermined amount of time (e.g., six months); such a time-out can be determined by the FSP's internal protocols and/or by governmental regulations. Also, the invention contemplates an automated alarm condition to inform the FSP that a Ledger has been inactive for a pre-determined period of time (e.g., six months). When the Ledger remains inactive for the specified time-out period, the Ledger can be automatically closed and archived and deemed inactive, and, if desired, reestablished later in time if it becomes necessary to open the account. Furthermore, the Documentation Library can be implemented with particular forms and/or notices to be sent informing the client that the account is stale and inquiring as to the distribution of any funds or holdings therein.

Figure 2:
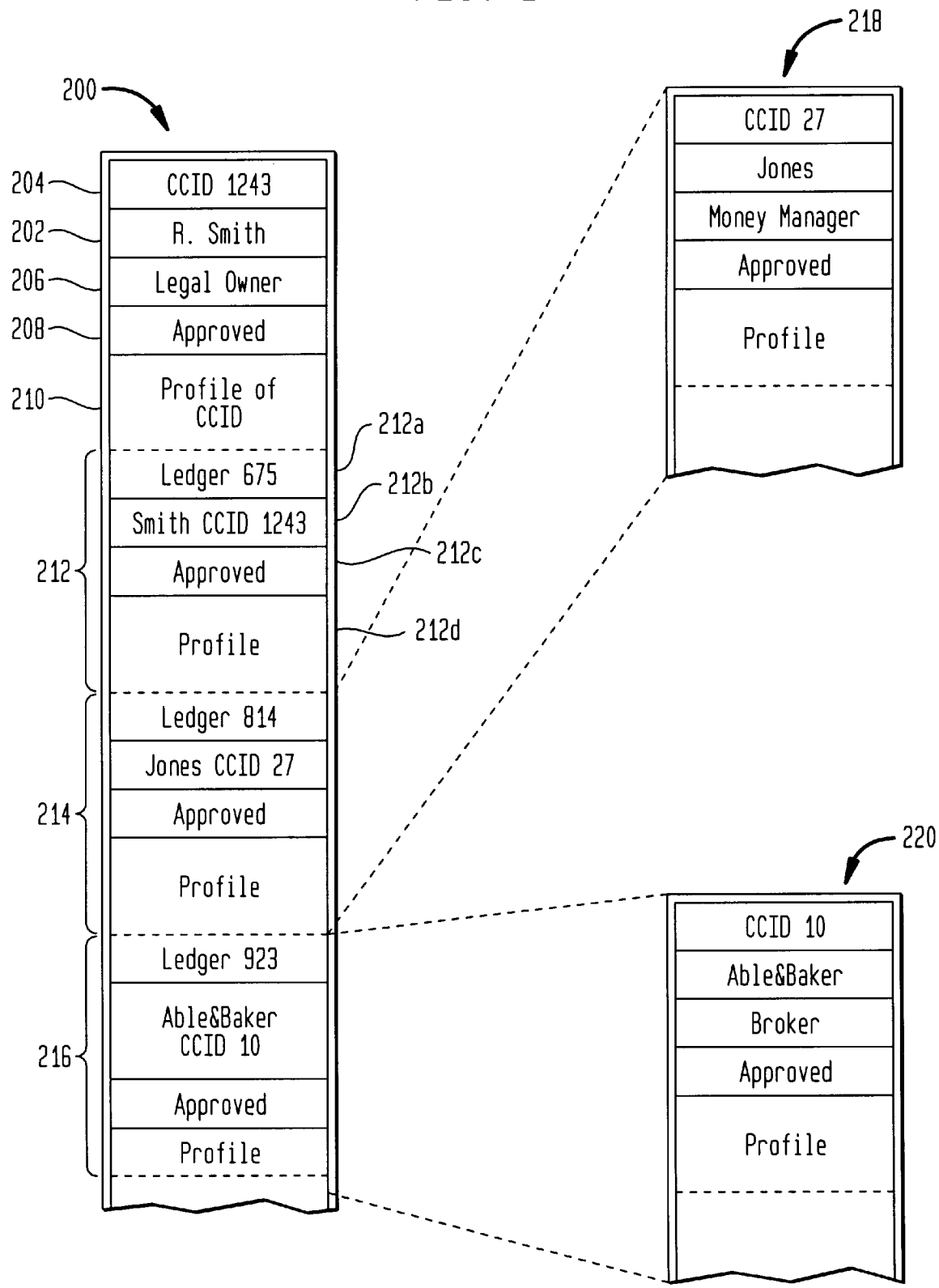
FIG. 2 is an idealized depiction of an embodiment of a CCID data structure created by and used by the present system.

FIG. 2 depicts an embodiment of an idealized data structure created by and used with the present system. As shown therein, the data structure 200 includes a field 202 for a client, R. Smith, who has been assigned CCID 1243, stored as field 204, and the entity has been assigned the designation of legal owner in field 206; the status of the CCID is stored and preferably also displayed as another field 208. The client's CCID record includes the Profile information 210 discussed above (e.g., address, delivery instructions, taxpayer ID, etc.) and can include a master ledger, here stored as specific Ledger number 765, in one or more fields 212, preferably comprising fields for the Ledger number 212a, the client CCID 212b, the status 212c, and a Profile 212d. The remainder of the client's record includes, in this example, a number of relationships to other CCIDs stored in fields 214 and 216 (as shown). In this example, relationship 214 is based upon a money market managed by Jones and includes fields analogous to those already mentioned for providing a separate Ledger and associate Ledger number, for the related party's CCID, the status of the relationship, and the Profile of the relationship. Another relationship 216 is to Able & Baker as the client's broker. Both of these relationships are also carried onto the data associated with the related CCID. As shown for Jones' CCID information fields 218, Jones is identified as an approved money manager with a Profile including a number of different relationships, including all of Able & Baker's clients who use Jones as a money manager. Likewise, the CCID information 220 related to Able & Baker's functioning as a broker for their clients has the same type of informational fields. As mentioned above, Able & Baker may have a number of CCIDs depending upon their particular role in providing products and/or services to their clients. Thus, there may be separate CCIDs for Able & Baker functioning as brokers, as a banking card clearing house, as money managers, and for any other products and services provided.

Figure 3:
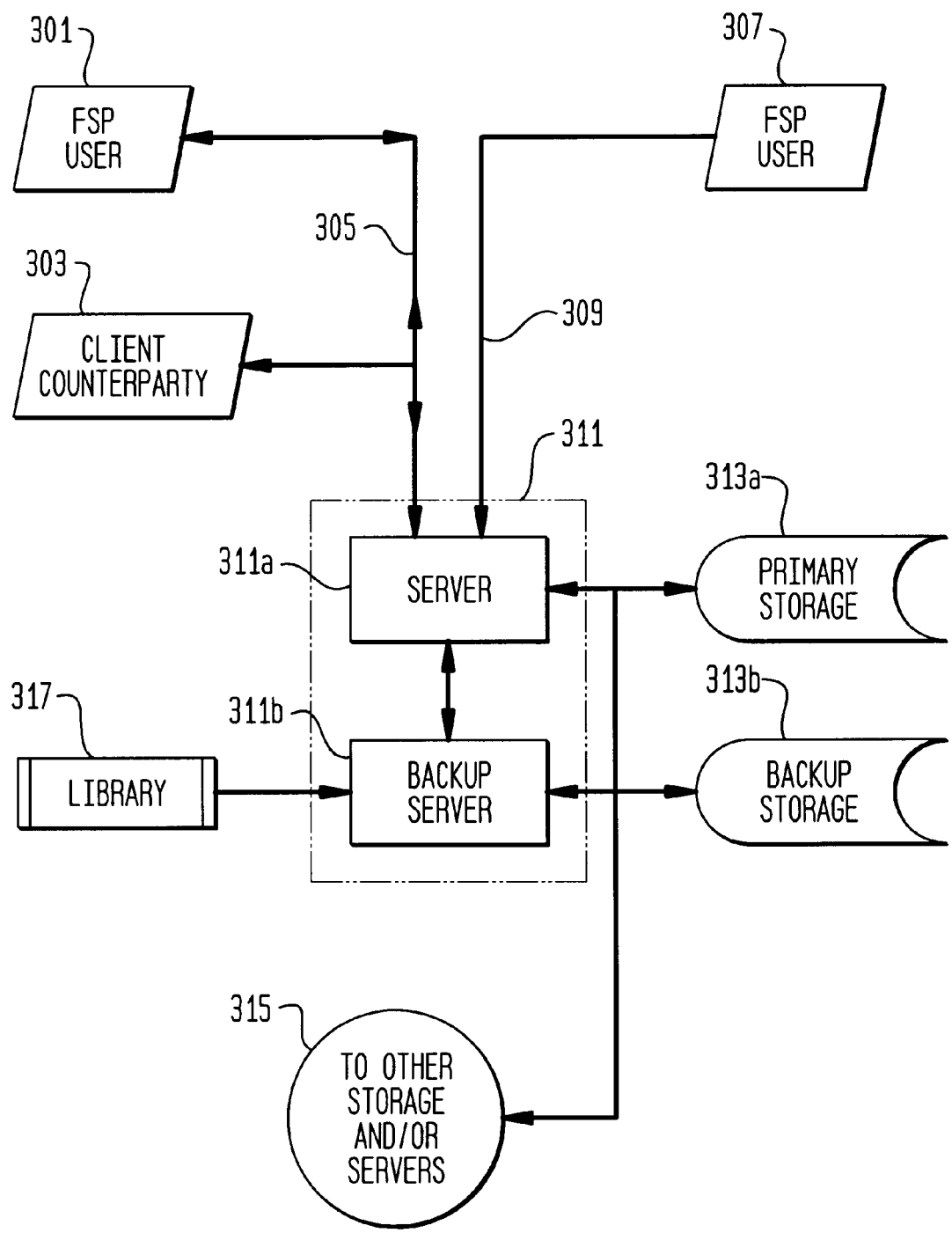
FIG. 3 is an idealized depiction of the storage architecture of an embodiment of this present invention.

FIG. 3 depicts an idealized, overall view of an embodiment of the present system as implemented in hardware. The FSP's Users 301, and clients and/or counterparties 303, if such access is allowed, can enter the system to perform any of the various functions described above. Such entities preferably communicate by an synchronous transmission modes 305 (e.g., NEONET system, available from Neon Software, or Teknekron system). Alternatively, or additionally, various other entities 307 (typically internal to the FSP), may communicate with the system via synchronous communication modes 309 (e.g., those commercially available under the names Orbix, PeerLogic Pipes, Covia CI, Sybase Open Client/Server, and DCE). By various methods, a user (internal or external) makes a request of the system to perform one of a variety of functions, such as creating or modifying a CCID, viewing a Ledger, entering a transaction, and the like. These requests are sent to the system's Server 311. In the preferred embodiment shown, the server comprises a primary 311a server and a back-up server 311b for redundant protection. The Server translates the request into a series of instructions necessary for its fulfillment; for example, providing the necessary onscreen or hard copy forms to formalize the desired transaction, searching for existing or related CCIDs, and the like. Hard and soft forms can be conveniently stored in a mass storage device 313a, such as a RAID disk system; again, it is preferably to have a backup mass storage system 313b for redundancy. The primary storage device can also be used to supply other servers or feed other storage devices 315, such as a data replication device, with the necessary information. The Library 317 system is connected to the Server for downloading forms to the mass storage devices. In practice, for example, the creation of a CCID including a transaction will generate user input to the server. The predefined FSP protocols and other Library rules (both as mentioned above) will be accessed by the Server, and instructions will be issued to retrieve forms necessary for the CCID creation and the transaction and will be returned to the requesting user and/or to the client or counterparty associated with the CCID (e.g., via mail, facsimile, modem, e-mail). The Server can then update the storage device with the status of the CCID and associated Ledgers.

Figure 4:
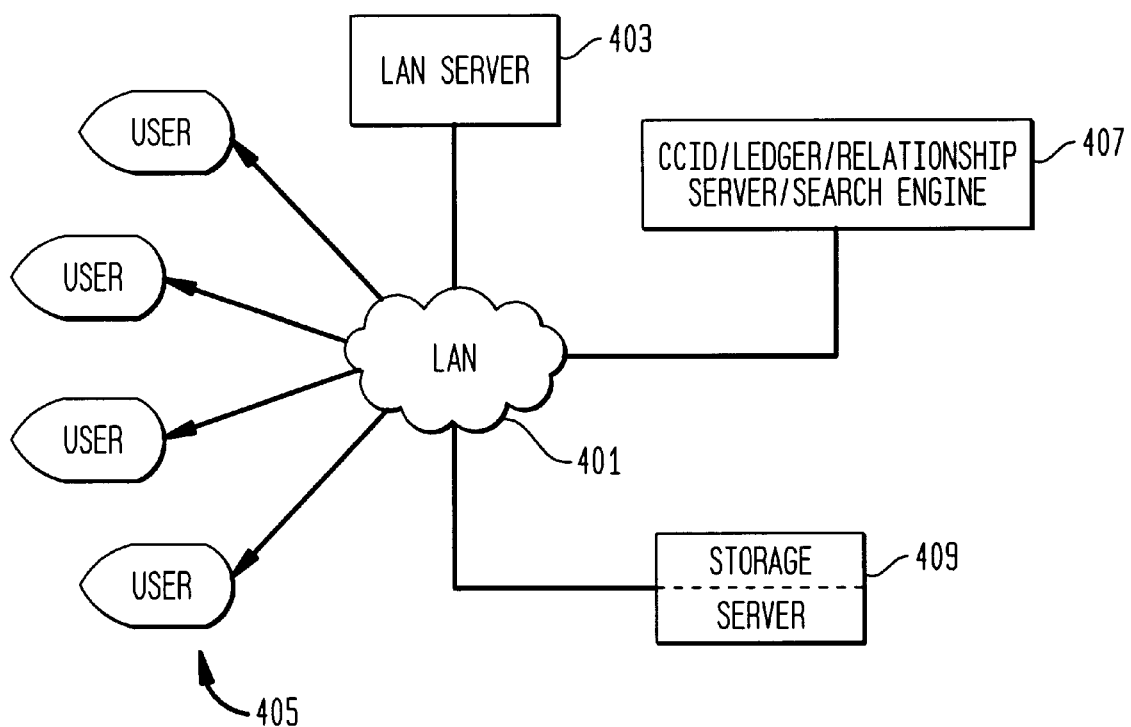
FIG. 4 is an idealized overview of an embodiment of the hardware architecture of the novel system.

FIG. 4 depicts another idealized method for implementing an embodiment of the present invention. A local area network (LAN) 401, or a wide area network, is provided with a network server 403 for handling requests from users 405; as before, these users can be internal to the FSP, external to the FSP (e.g., clients and counterparties), or a combination thereof). The LAN server services the users' system requests and forwards the requests to the Server/Search Engine 407. The Server returns a request to the network for certain data, which the Server requests from the mass storage device 409 through its associated server. The result from the mass storage device is forwarded via the network back to the Server/Search Engine, which determines the result of the User's request and forwards the result back to the network; the network server then forwards this result back to the user. As before, the result can include a data screen, screen forms, and hard forms to the user or to a third party. Depending upon the desired architecture, a number of networks may exist, all of which can be tied to the system Server/Search Engine, and this Server connected to a central mass storage device that is not integrated with any particular network.

In each of the embodiments of FIGS. 3 and 4, the above-described security measures can be implemented locally (or remotely) at the user's interface, at the server, and/or at an intermediate point. In certain situations, especially for very sensitive information, it may be desirable to have security measures at two or more locations within the system.

As described, it should be inferred that the searches can be implemented using conventional database searching techniques and devices (e.g., SQL-based mainframe systems). Likewise, it is preferred to provide users with a user-friendly graphical user interface (commonly referred to as a GUI interface) to facilitate displaying data to the user and guiding the user through easy use of the system.

Another embodiment of the present invention includes access to an open item bookkeeping system. Such a system can be analogous to the present system in maintaining transaction information and providing access and modification thereof using mass storage devices and servers therefor. In such systems, it is preferred that the data be maintained redundantly, in both a high availability storage media designated as the primary location for storing and retrieving information, and in a low availability storage medium used essentially for archiving purposes. Such a system can also provide virtual or background information on a given transaction, termed herein "shadowing." For instance, a client's Ledger may show that a certain transaction has occurred, or that a certain amount of funds are available. The shadowed transaction record will give an indication of the exact status of the transaction for internal purposes. As an example, the value of an investment instrument can be comprised of both principal and interest: from the client's perspective, the Ledger may only display the total value of the instrument; the shadowed display can break down the components of the instrument into principal and interest and use this information for further processing (e.g., generating interest income tax forms (1099-INT)). Other examples of shadowed information that would not be immediately accessible to an outside party/client can include allocated and cleared holdings, and distinctions between face, principal, and net cash values. This bookkeeping system can be integrated with the present distributed system to provide a Ledger having shadowed information for the FSP's users, and lacking shadowed information for all external parties.

In yet another embodiment, the invention contemplates the use of demons, programs designed to identify whether or not any changes have been made to a particular data file. For example, a database external to the FSP can contain information about mutual fund holdings, interest rates, new offerings, and the like, including new SEC filings. The demon program is designed to search such databases and report on any changes that have been identified since the database was last accessed. The demon program can then update any database associated with the present invention to maintain the latest information.

In the financial industry, as with many others, dates trigger the occurrence (or non-occurrence) of certain events. For example, a required SEC filing may require a further filing 30 or 60 days subsequent. The Documentation Library will include such rules, and when a demon identifies a new filing and updates the FSP's database with the new information, there is preferably a prompt for another demon search within a set period of time to look for the subsequent filing (and check for new ones). Preferably, when the demon acquires information from an outside database, the data is changed into a format suitable for the FSP's internal database(s) before the transfer is made. Analogously, demons can be used to write information to external databases driven by changes in the FSP's internal database. Also, demons can be used to update the Documentation Library as a function of the particular date (e.g., quarterly filings, 10-Ks, 10-Qs, and the like).

Figure 5:
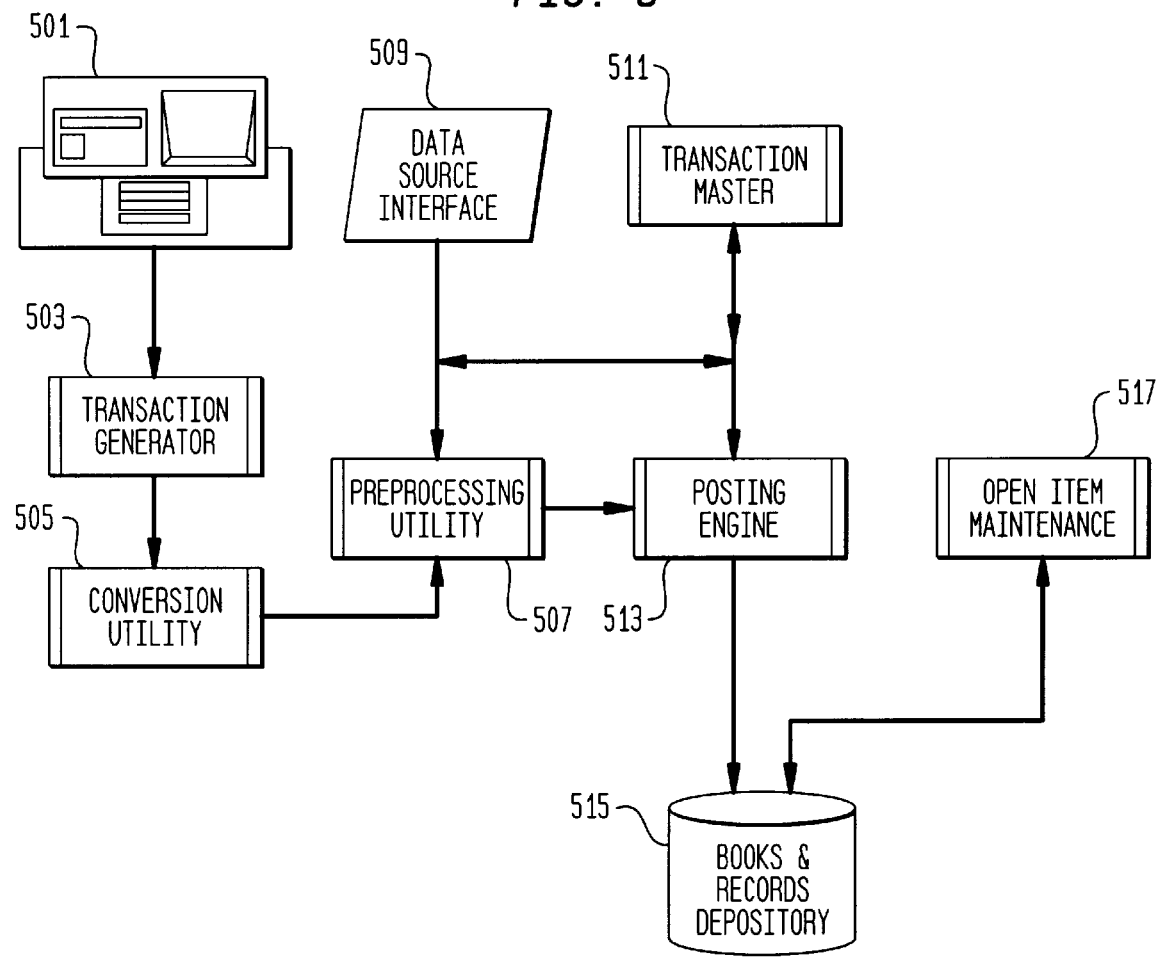
FIG. 5 is an idealized data flow diagram depicting the relationship among the trader, transaction master, and books and records depository.

From the foregoing discussion of FIG. 2, part of the present invention includes deriving information for a client by indirectly addressing information about the counterparty or the real party in interest. In another embodiment of this invention, the general concept of deriving and/or supplementing information from an incoming data set to provide an outgoing data set is implemented for other aspects of financial transactions, especially for brokered financial transactions. An overview of this brokered transaction system is shown in FIG. 5, the group of components shown comprises a "Transaction Master" that performs a number of different functions on the incoming data set. Preferably, the Transaction Master performs data conversion, data validation, and/or data enrichment using transaction rules. The Transaction Master can also perform posting and reporting functions using the converted, validated, and/or enriched data in combination as determined by posting and open item maintenance rules.

Figure 6:
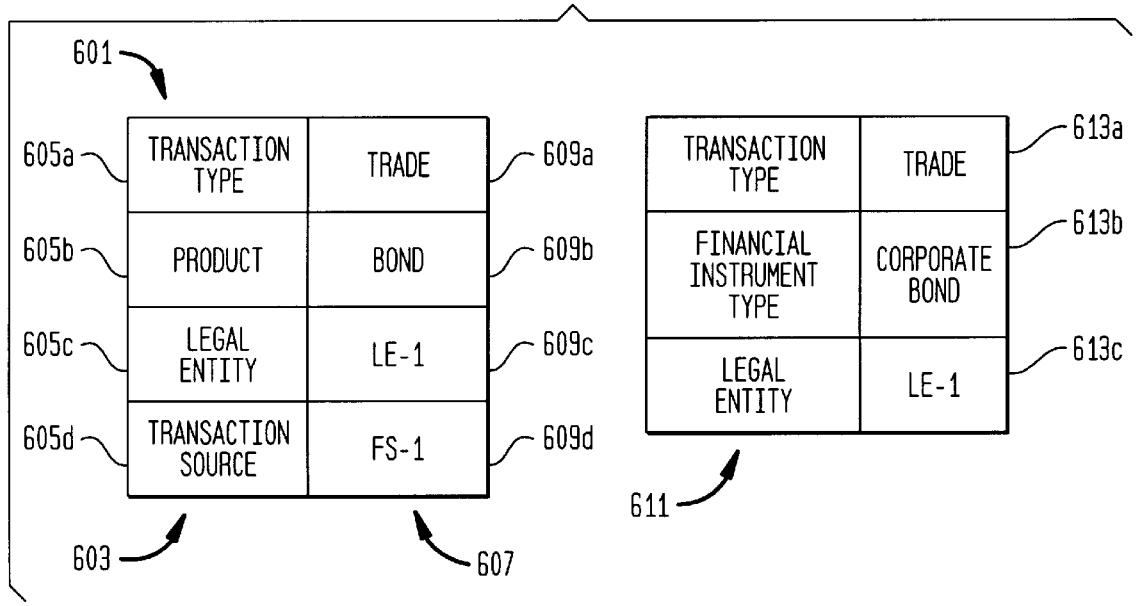
FIGS. 6 and 7 provide idealized views of pre- and postconversion or normalization of data.

Assume a trader 501 has entered a brokered transaction into a computer workstation, remote unit, or other data entry point. The electronic data entered is converted into a data form particular to brokered financial transactions by the transaction generator 503. The transaction generator takes and manipulates the transaction information entered by the trader into a pre-defined transaction template, such as the partial template 601 shown in FIG. 6. The partial template includes information 603 directly from the brokered transaction data entered by the trader, such as the transaction type 605*a*, the financial product brokered 605*b*, the legal entity under which the brokered transaction was made 605*c*, and the source or entity initiating the transaction 605*d*. The data in the partial template is passed to a conversion utility 505 in which the transaction data is transformed into conversion template data 607. As shown, each of the data types is mapped to a corresponding unit in the conversion template based on the transaction data generated: for example, the transaction type becomes a trade 609*a*, the product is identified as a bond 609*b*, the legal entity is identified as LE-1 ("Legal Entity-1") 609*c*, and the transaction source is identified as FS-1 ("Financial Source-1") 609*d*. In addition, the conversion utility can provide additional templates for additional downstream and/or parallel processing. For example, for book and record keeping functions (discussed further below), the conversion template data, or the original transaction data, is converted to recording keeping data 611; in this example, a subset of the conversion data is mapped onto the recording keeping data as 613*a*, 613*b*, and 613*c*, corresponding to the same transaction type, product, and legal entity information 609*a*, 609*b*, and 609*c*.

Figure 7:
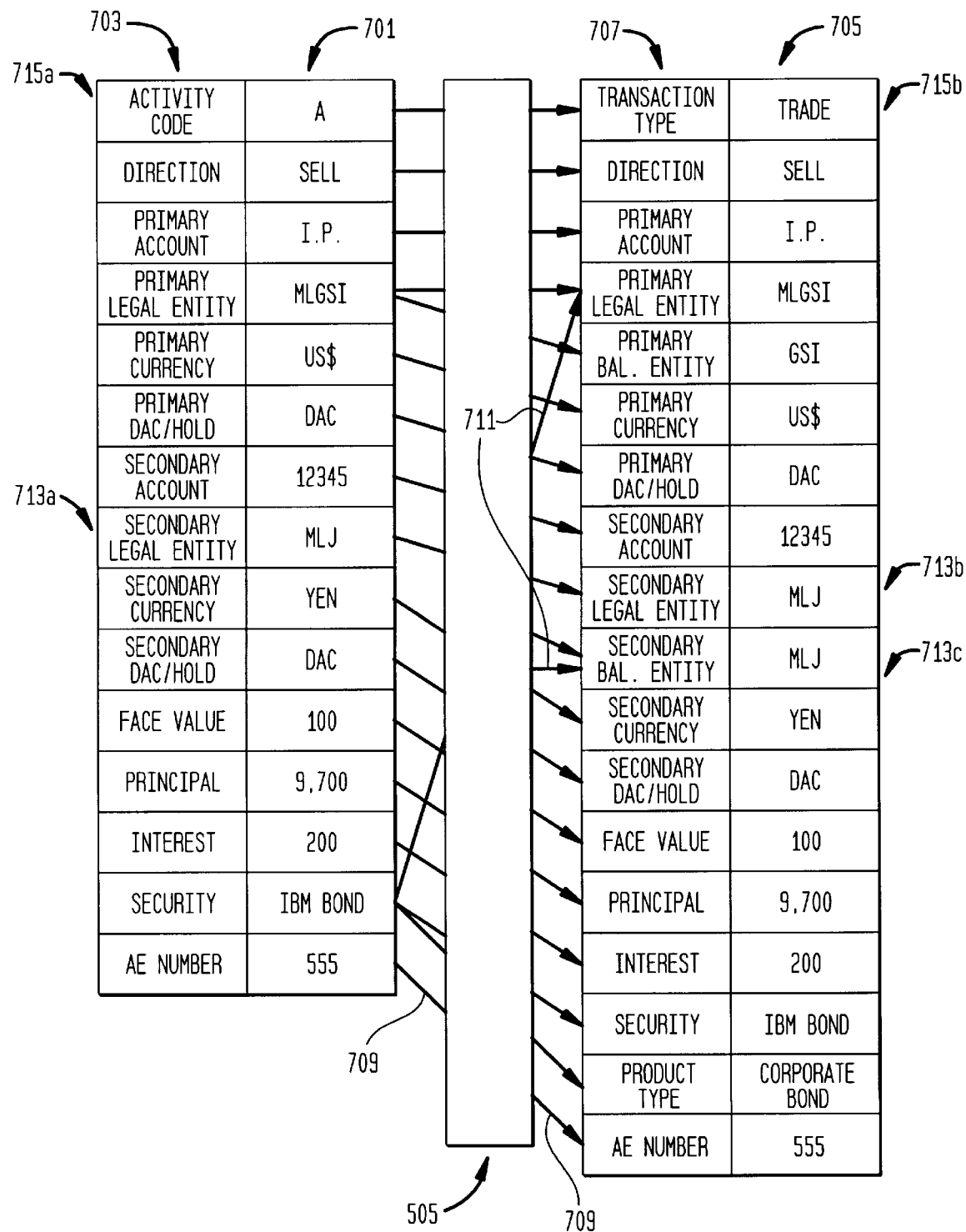

Another view of the functioning of the conversion utility is shown in FIG. 7, in which transaction data 701, corresponding to pre-determined variables 703 is manipulated into conversion data 705 on a different pre-defined template variables 707. As shown, some of the data is mapped directly 709 from one template to the other. Some of the data is derived 711 from one or more of the data in the incoming template. As shown, for example, if a secondary legal entity is involved, a bookkeeping entry must be made in the outgoing template for further processing; here, the secondary legal entity 713a is mapped from the incoming to the secondary legal entity of the outgoing template 713b and, from the particular secondary legal entity, a secondary (legal entity) balance entry 713c is derived.

A third type of processing that the conversion utility performs is a translation of information from the incoming to the outgoing template. For example, an activity code 715a, which can be a bit or a small byte-sized word in the data, is translated by the conversion utility into a transaction type 715b.

Data is preferably captured as close as possible to its physical point of generation, which enables further processing without multiple sources of data, and which supports multiple views of the same data. The data generated by the transaction generator preferably includes linkage information to connect and track customers and transactions across different ledgers and/or different physical locations. Linked transactions can be generated by a common "tag" or field (parameter) associated with the transaction data. During processing of a given transaction, other transactions typically result; for example, a trade transaction will be processed into a ledger transaction, and all of these subsequent transactions should be linked together.

From the conversion utility 505 in FIG. 5, the templates and the associated data are operated upon by a preprocessor 507 to perform a validation and/or to further enrich the data. Data enrichment, as used herein, means that additional data is derived from the incoming data, optionally also using one or more secondary data sources, and providing an outgoing data template having the newly derived data. As such, the data associated with the outgoing template is enriched in comparison with the data on the incoming template, usually because the template has expanded (or is modified) from the incoming template. Data validation is accomplished in combination with a data source interface 509 that includes, or can indirectly address, information about the types and values of information in each of the data fields in the conversion template being sent for further processing. Types of validations include checking whether the currency type identified with a particular transaction is correct (e.g., that a trade originating from London is reported in pounds sterling), whether a given legal entity (or an associated counter-party) exists, whether the security type and value are correct, and the like. The data relied upon for these types of validations may also rely on an outside, updatable source, such as a listing of valid ticker symbols, clients, counterparties, currencies, and so on. The validation operation preferably also validates the date types and formats of the date data in the conversion table being sent for further processing. For example, a date from a trade initiated in a European office may have a European date format (day/month/year), whereas a main office in the United States will require an American date format (month/day/year), and other entities or parts of the business (e.g., compliance, payroll, etc.) may require other date formats (e.g., Lilian, Julian, etc.). The preprocessor preferably not only validates the date type and format, but also converts the date format to a different particular format if the outgoing data template requires that particular format for the later processing. Still further, the preprocessor can generate and add a reference number data field to the template for later cross-checking and referencing. Because the preprocessor performs data validation, the preprocessing routines preferably also include error handling capabilities to take appropriate action when data is invalid or not able to validated.

On the administrative level, the data source interface, conversion utility, and preprocessor can be controlled by a transaction master 511 by which the system administrator can vary the manner in which different types or fields of data are converted and preprocessed.

One of the downstream processing steps after the preprocessor is performed by the posting engine 513. The posting engine can be though of as a process for transforming the date incoming template from the preprocessor into a form that is desired or conventional for use in typical book and record keeping, which can be stored electronically in a repository 515. Analogous to the conversion utility, the posting engine decomposes the incoming data according to pre-defined posting rules. For example, when the engine posts a credit, it must also post a debit elsewhere in the repository for proper and balanced reporting, which is accomplished by open item maintenance 517. The posting engine can also update the information in the repository, such as checking for negative balances and for reporting up-to-date balances.

Although the transactions exemplified above have typically been stock trades, the invention contemplates a product master database (PMD). This database includes information about all "products", securities and financial instruments, that an entity buys or sells, or which a broker (or brokerage) or institution underwrites, distributes, tracks, clears, analyzes, or in which the entity otherwise does business.

These systems are integrated by a server-network environment. The broker, trader, or other system user (as opposed to systems administration or maintenance) preferably has a workstation or other means of accessing the system. The workstation is preferably linked to other workstations locally by a network (e.g., LAN), which may be linked to other systems and/or databases by a larger network (e.g., WAN). The user enters information and a request or command through the GUI (graphical user interface) presented on the workstation. The command is interpreted by a request driver (RD) that initiates further processing. Downstream from the RD are function processors (FPs), essentially applications servers, and data servers (DSs) for accessing databases. Disposed between the RD and the FPs/DSs are application program interfaces (APIs). The APIs are a key facet of the system by normalizing incoming and outgoing data into a format that is transparent to the FPs and DSs. That is, information from the user passing through the request driver, or from an outside database, is converted by the API into a form that is function- and device-independent, and can be operated upon by any of the downstream applications. In this way, the same function and/or data can be used with different applications programs, eliminating redundant functions and data. For example, some programs may require dates in a format such as mm-dd-yyyy and some require yyyymmdd; the API tailors the data for the particular application being called and to which the data and/or parameters are being passed. Data and parameters may be passed from remote databases or from other databases or users within the local or extended network; the API tailors or converts such data into a type that can be operated upon by the particular application or database called.

The present system can be used in combination with various systems for brokerage, cash management, and/or trading, and for displaying financial information, as described variously in U.S. Pat. Nos. 4,346,442, 4,376,978, 4,597,046, 4,774,663, 5,270,922, 5,297,032, 5,671,363, 5,826,243, and 5,878,258 and in copending applications 306,382 filed Sep. 15, 1994, 699648 filed Aug. 19, 1996, 833,137 filed Apr. 4, 1997, and 940,244, filed Sep. 30, 1997, the disclosures of which are incorporated herein by reference.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A system for controlling a client's account with a financial service and/or product provider (FSP), said system comprising:
   A. a database of all client and counterparty entities with which and through which the FSP provides services and/or products, said database comprising data specifically related to such client or counterparty, and to the FSP, and comprising
      i. a unique data identifier for each such client and counterparty entity, wherein a unique identifier is provide for each separate function such counterparty or FSP performs, and
      ii. an indirect addressing data field identifying a relationship to another client or counterparty with which such client or counterparty in part i. conducts transactions;
   B. input and modification devices for implementing one or more data manipulation functions selected from the group consisting of creating and/or changing said unique data identifier, creating and/or changing said indirect addressing data field, and creating and/or changing clients and counterparties;
   C. a ledger system for recording financial transactions of said client, said counterparty, and/or said FSP wither reference to said unique data identifier; and
   D. a library system, comprising
      i. storage of a document related to a counterparty or FSP or a particular type of financial transaction, said document indexed with reference to the unique data identifier for the counterparty or FSP,
      ii. at least one rule for determining which stored document is required for said particular financial transaction, and
      iii. a transfer device for transferring said stored, required document to at least one party engaging in said particular type of financial transaction.

2. The system of claim 1, further comprising a Global Delivery Instruction Set for recording delivery instructions particular to a given client having said unique data identifier and to a given particular type of financial transaction.

3. The system of claim 1, further comprising a security device for determining whether to allow or deny access to said database by particular database entities.

4. The system of claim 3, further comprising allowing or denying access based on said determination.

5. The system of claim 1, wherein said rule is related to required governmental disclosures.

6. The system of claim 5, further comprising an alarm system for alerting the FSP when a required document has not been executed within a predetermined period of time.

7. The system of claim 1, wherein said database is retained in a mass storage device and is accessed by a server therefor.

8. The system of claim 7, further comprising a back-up server.

9. The system of claim 8, further comprising a back-up mass storage device accessible by said back-up server.

10. A system for recording and maintaining financial trading information, comprising:
    A. a data input device for entering financial trading information comprising a set of trading data;
    B. a transaction generator for associating said financial trading information with a transaction data template having fields associated with selected members of the set of trading data and generating transaction data having said selected data associated with particular transaction data template fields;
    C. a converter for operating on said transaction data template and said selected data and, by mapping, deriving, and translating said selected data, generating a conversion template having data fields and conversion data associated therewith;
    D. preprocessing said conversion data in the conversion template to validate the format and/or content of the data; and
    E. processing the validated data to generate financial bookkeeping repository data and updating previously stored bookkeeping repository data to generate current financial bookkeeping repository data.

11. A system for managing the transaction, in the form of buying, selling, underwriting, distribution, tracking, clearing, and/or analyzing, of a financial product by a client, which system comprises:
    A. a plurality of stations for user entry and/or receipt of data and/or commands relating to said financial product and said transaction, each of said stations providing a user interface for accepting said entry and/or receiving said data, and said plurality of stations communicating through a network;
    B. at least one database for storing data about (i) said client and any related counterparty to said client, (ii) said financial product, and (iii) activity, positions, and balances for said client, said at least one database accessible through said network;
    C. at least one application program for processing said commands and data associated therewith, said application program accessible through said network; and
    D. an application program interface, through which data and/or commands pass between said station and one or both of said database and said application program, for normalizing commands and data into a format accepted by said station and by said database and said application.

* * * * *